(12) United States Patent
Chapman

(10) Patent No.: US 12,052,403 B1
(45) Date of Patent: Jul. 30, 2024

(54) GLOSS EFFECT WITH IMPROVED HIDING

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/379,097

(22) Filed: Oct. 11, 2023

(51) Int. Cl.
   *H04N 1/62* (2006.01)
   *H04N 1/58* (2006.01)

(52) U.S. Cl.
   CPC .................. *H04N 1/58* (2013.01); *H04N 1/62* (2013.01)

(58) Field of Classification Search
   CPC .................................... H04N 1/58; H04N 1/62
   See application file for complete search history.

(56) References Cited

U.S. PATENT DOCUMENTS

| 7,639,400 | B2 | 12/2009 | Hains |
| 8,310,718 | B2 | 11/2012 | Chapman et al. |
| 9,082,068 | B1 * | 7/2015 | Chapman ................. H04N 1/62 |
| 9,148,546 | B2 | 9/2015 | Miller et al. |
| 9,237,253 | B2 | 1/2016 | Chapman et al. |
| 9,781,294 | B1 | 10/2017 | Chapman |
| 2006/0209349 | A1 * | 9/2006 | Tabata .................... G06T 1/005 382/100 |
| 2022/0070335 | A1 * | 3/2022 | Matsushima .......... H04N 1/603 |

FOREIGN PATENT DOCUMENTS

| CA | 2893092 A1 * | 5/2014 | ............. B41M 1/10 |
| EP | 2230088 B1 | 5/2012 | |

* cited by examiner

*Primary Examiner* — Ted W Barnes
(74) *Attorney, Agent, or Firm* — Ortiz & Lopez, PLLC; Luis M Ortiz; Kermit D Lopez

(57) ABSTRACT

Methods and systems for rendering a gloss effect can involve determining among a first color and a second color, which of the first color or the second color is mixed with a black colorant that is furthest from a rich black colorant; selecting a first color with the black colorant; selecting a second color to be fully black and a least rich black colorant; creating an object with the first color and entering data within the object opaquely with the second color; and rendering a document with the object including the data with the object, wherein the object with the data can exhibit a gloss effect based on the first color and the second color.

20 Claims, 12 Drawing Sheets

GLOSS EFFECT WITH IMPROVED HIDING

TECHNICAL FIELD

Embodiments are related to image processing methods, systems and devices. Embodiments also relate to the field of specialty imaging used in printing applications. Embodiments also relate to the creation and rendering of a gloss effect with improved hiding capabilities.

BACKGROUND

Specialty imaging techniques are a set of advanced and specialized methods used in security printing applications, including the incorporation of digital watermarks. These techniques are designed to enhance the security and authenticity of printed documents, such as banknotes, passports, ID cards, and other sensitive materials, by making them difficult to counterfeit or reproduce accurately.

Specialty imaging is useful for the creation of digital watermarks, which are embedded patterns or information within a printed image that are typically imperceptible to the human eye but can be detected using specialized equipment or software. Digital watermarks (sometimes referred to simply as a 'watermark' or 'watermarks') can server as a means of authentication and can contain information such as the document's origin, serial number, or security features.

Digital watermarks may be visible or invisible. Visible watermarks are discernible by the naked eye and may include text or patterns that are difficult to replicate accurately. Invisible watermarks are hidden within the document's content and require specialized tools for detection. Watermarks can be robust, meaning they remain detectable even after various printing and scanning processes, or fragile, meaning they are easily damaged if the document is tampered with.

One example of a specialty imaging technique is the high-resolution scalable gloss effect, which is a specialty imaging security printing technique that appears as a single color when viewed straight (and does not copy) and has easily viewable text or other graphics when tilted. This specialty imaging feature can be created by using two similar Lab values while maximizing the toner pile height difference. Some issues with this specialty imaging feature are that it requires a more expensive coated media and currently only available on production devices. Older glossier toners were able to hide the watermark at one angle unlike current emulsion aggregation (EA) toners. So-called registration ink was an improvement in watermark quality but ran a risk by bypassing ink limits.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide for improved methods and systems for rendering a gloss effect.

It is a further aspect of the embodiments to provide for methods and systems for rendering a gloss effect with improved hiding.

The aforementioned aspects and other objectives and advantages can now be achieved as described herein. In an embodiment, a method for rendering a gloss effect, can involve: determining among a first color and a second color, which of the first color or the second color is mixed with a black colorant that is furthest from a rich black colorant; selecting a first color with the black colorant; selecting a second color to be fully black and a least rich black colorant; creating an object with the first color and entering data within the object opaquely with the second color; and rendering a document with the object including the data with the object, wherein the object with the data can exhibit a gloss effect based on the first color and the second color.

In an embodiment, the document when rendered with the object can include the data comprises a watermark with the gloss effect that hides at one angle and appears at another angle on both coated media and uncoated media.

In an embodiment, the object can comprise a text box and the data within the object comprises text.

In an embodiment, the text rendered may include textual content, graphical elements, or a combination thereof.

In an embodiment, rendering of the document can further involve formatting the document in an electronic format independent of software, hardware or an operating system in which the document is viewable.

In an embodiment, rendering of the document can further involve transmitting the document in an electronic document format to a printer for printing.

In an embodiment, the electronic document format may comprise a page description language (PDL) document.

In an embodiment, rendering the document can further involve printing the document via a printing system.

In an embodiment, a method for generating a print-ready document with optimized color contrast, can involve: determining, by a computing device, which single color, when mixed with black, produces a resultant color that is the farthest from rich black; selecting, by the computing device, the determined single color as a first color; selecting, by the computing device, a second color comprising 100% black and 100% of the color that makes it the least rich when mixed with black; creating, by the computing device, a text box within the document and filling the text box with the first color; writing text, by the computing device, within the text box, rendering it in an opaque manner using the second color.

An embodiment may can further involve transmitting by the computing device, the document in an electronic document format to a printer for printing.

In an embodiment, system for rendering a gloss effect image on a recording medium, can include a processor and a computer-readable medium containing programming instructions that can be configured to cause the processor to: determine among a first color and a second color, which of the first color or the second color is mixed with a black colorant that is furthest from a rich black colorant; select a first color with the black colorant; select a second color to be fully black and a least rich black colorant; create an object with the first color and entering data within the object opaquely with the second color; and render the object including the data with the object on a recording medium, wherein the object with the data exhibits a gloss effect based on the first color and the second color.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION

Figure 1:
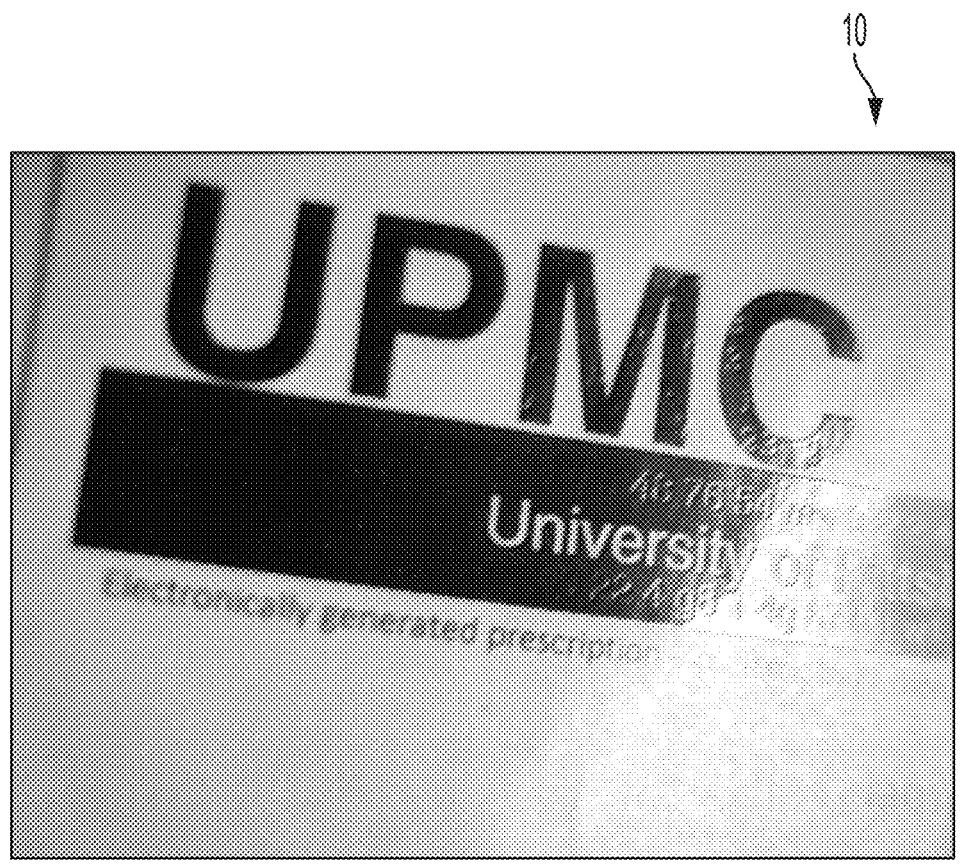
FIG. 1 illustrates an image of a sample prescription produced based on a MicroGloss specialty imaging technique.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term "metameric" as utilized herein can relate to a metameric pair of pattern ink. In a metameric pair of pattern ink (also referred to simply as a "metameric pair") the printing and paper are not visually distinguishable when viewed from one angle but are from another angle (relative to a light source) which can create a watermark without more expensive spot inks, toners, and/or printers.

The term L*a*b (also referred to as Lab or LAB) as utilized herein relates to the CIELAB color space (L*a*b), which is a color space defined by the International Commission on Illumination (CIE). L*a*b It expresses color as three values: L* for perceptual lightness and a* and b* for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color.

The term CMYK as utilized herein relates to the CMYI color model, wherein CYMK refers to the four ink plates used: cyan, magenta, yellow, and key (black). The CMYK model works by partially or entirely masking colors on a lighter, usually white, background. The ink reduces the light that would otherwise be reflected. Such a model is considered subtractive because inks "subtract" the colors red, green and blue from white light. White light minus red leaves cyan, white light minus green leaves magenta, and white light minus blue leaves yellow. An example of an additive color model is the RGB color model in which the red, green, and blue primary colors of light are added together to reproduce a broad array of colors. "RGB" relates to the three primary colors, red, green and blue. RGB (i.e., the RGB color model) can be used for sensing, representation, and display of images in electronic systems, such as televisions and computers.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

In the area of security printing, documents can be protected from copying, forging and counterfeiting using multiple techniques. Specialty imaging as discussed previously is one such method of security printing which can use standard materials such as papers inks and toners. Typically, security printing companies in the marketplace require special (expensive) materials. An example document is a prescription where a pharmacist would like to be able to have a high level of confidence that the document is genuine.

MicroGloss (or Artistic Black for VIPP) is one example of a specialty Imaging technique. This specialty imaging feature does not require a special tool (e.g., UV light) to view and is particularly strong in anti-copying. MicroGloss uses a pair of colors, which can appear about the same when viewing straight on but display a differential gloss when tilting due to the pile height of the toner or ink.

FIG. 1 shows an example of a MicroGloss implementation. FIG. 1 illustrates an image 10 of a sample prescription produced based on a MicroGloss specialty imaging technique. Note typically the entire black rectangle of Micro Gloss would be visible under office illumination. For the image 10 shown in FIG. 1, a small LED was the light source and visibility depends on the angle of the light source and the viewer. MicroGloss is a current product used in production equipment. "MicroGloss" as the name implies is limited to very small sizes. While the gloss effect may work at any size, it becomes easily readable at all angles when not at a very small size. This is no longer a limitation with the new gloss effect offered by the embodiments, as discussed in more detail below.

It can also be seen in FIG. 1 that parts of the UPMC logo exhibit the gloss effect (as seen at an angle) and other parts do not (when viewed straight on). The small text, however, is present in the entire UPMC logo and black box in the image 10 in FIG. 1. Ignoring ink limits the text box has a pile height of 4 pixels CMYK and the text has a pile height of 1 pixel K which is equivalent to etching the text out of a 3-dimensional block of CMYK. The actual pile height is closer to about 2.5 pixels.

Figure 2:
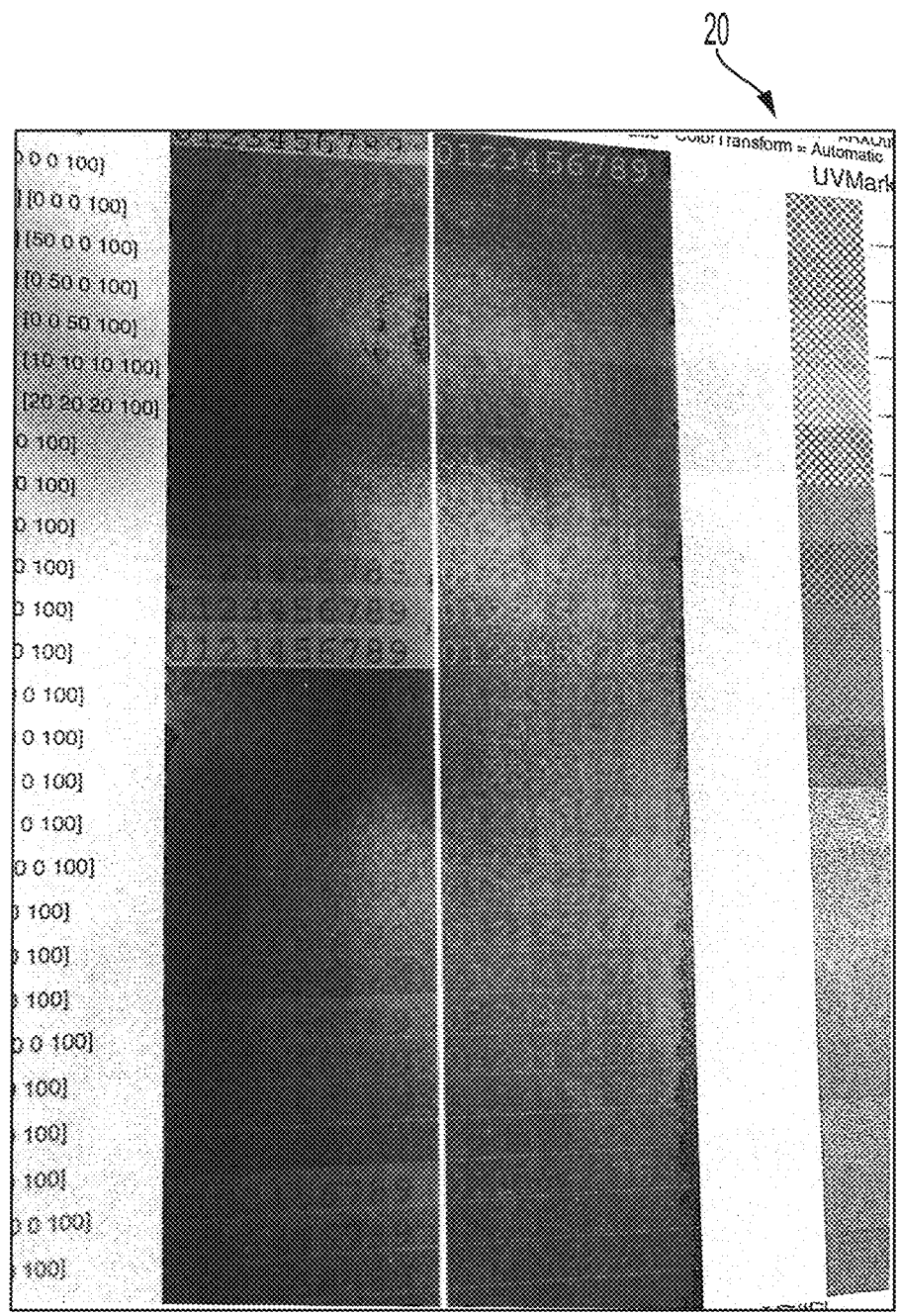
FIG. 2 illustrates an image of a swatch sheet at one angle.
Figure 3:
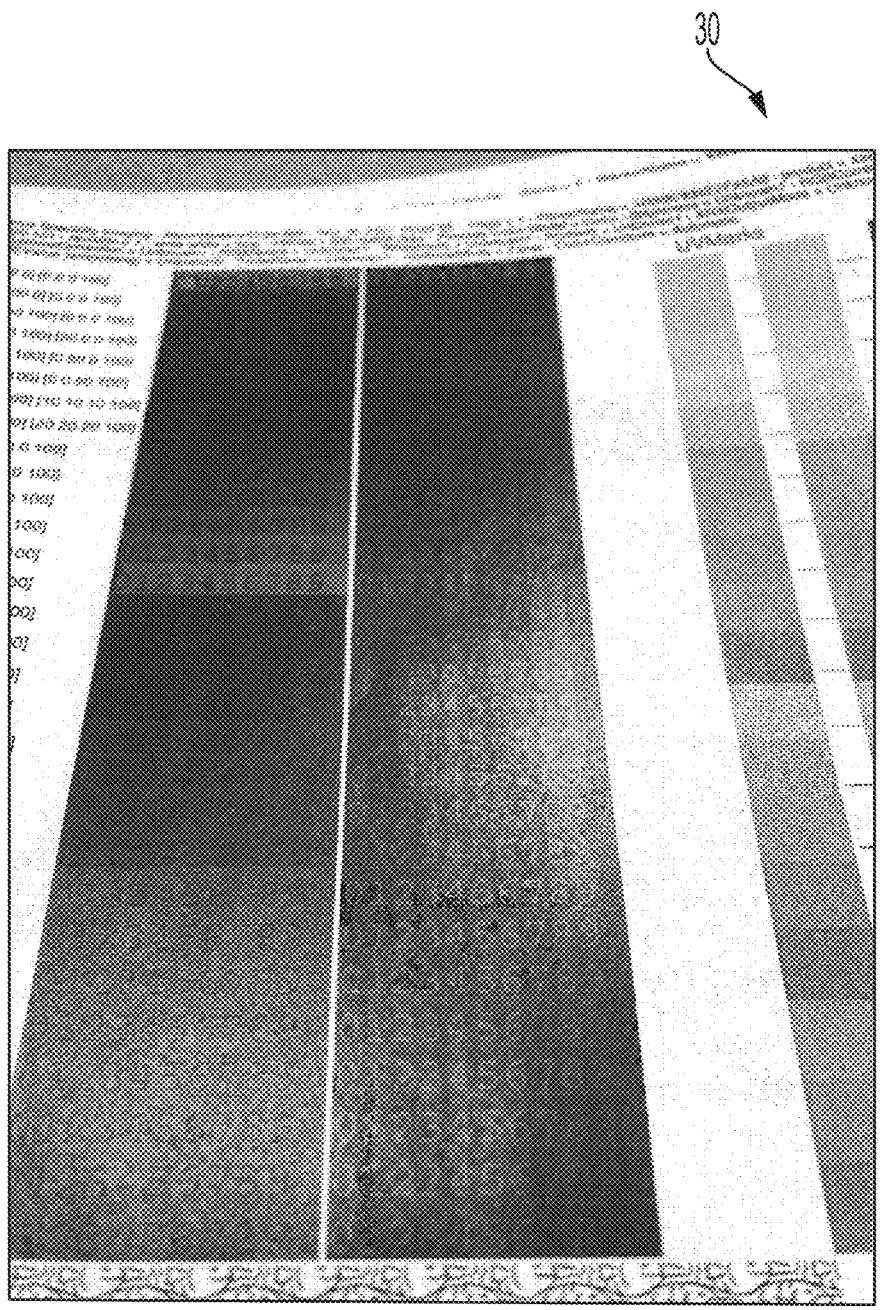
FIG. 3 illustrates an image of a swatch sheet at another angle.

FIG. 2 illustrates an image 20 of a swatch sheet at one angle. FIG. 3 illustrates an image 30 of a swatch sheet at another angle. A MicroGloss swatch sheet can be created with several experiments with results expected to be different when varying printers. Starting with the $4^{th}$ swatch CMYK verse K was changed to CMYK vs rich/warm/cool K. This is not to improve the gloss effect but to improve the hiding between the text and the background text box. While the hiding was sufficient, the degraded gloss effect no longer worked. The next group is equal amounts of CMYK verse K. The hiding and gloss effect were both degraded. The group from [60 60 60 100] [0 0 0 100] to [30 30 30 100] [0 0 0 100] are 100% K with equal CMY verses 100% K. These fit under different ink limits e.g., the first one being 280%. This group shows the most promise, but still has hiding issues and a weaker gloss effect. The last group had some swatches that showed promise. FIG. 2 and FIG. 3 thus show the swatch sheet at different angles.

The steps or operations of the methodology shown below can be implemented to generate a gloss effect with improved hiding:

1) Determine which single color mixed with black is the farthest from rich black
2) Select color one to be black
3) Select color two to be 100% black and 100% of the color that makes it the least rich
4) With a tool e.g., InDesign create a text box and fill it with color one
5) Write text in the text box opaquely with color two
6) Send PDF or PostScript to printer Note that steps 3 and 4 can switch colors and the effect works about the same. Rich black from a graphic artist viewpoint is blacker than black. For a CMYK printer Y (yellow) is the color that is chosen. Many highlight colors such as white, florescent yellow and pink should also work. Clear is a possibility. This also means a monochrome plus highlight printer can for the first time have a gloss effect.

Figure 4:
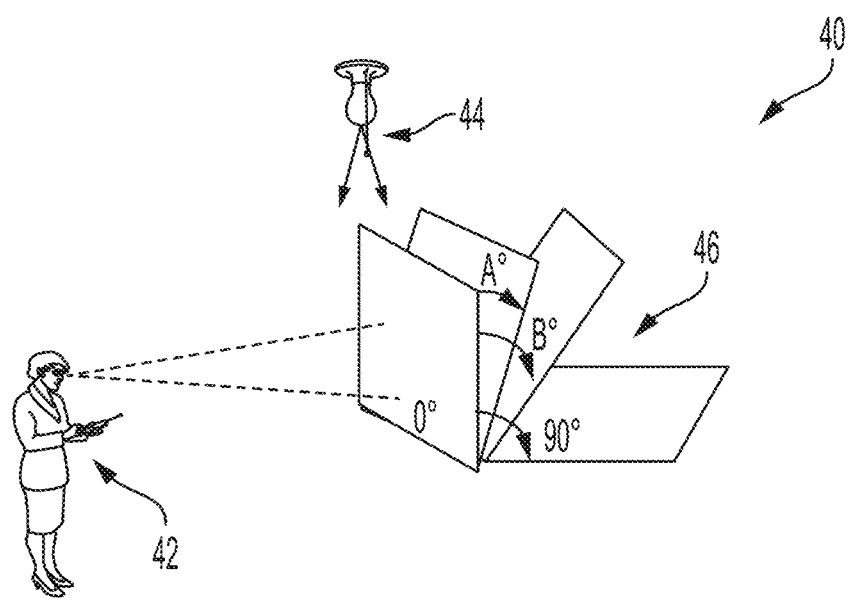
FIG. 4 illustrates a schematic diagram depicting a viewing angle with respect to an observer of a gloss effect, in accordance with an embodiment.

FIG. 4 illustrates a schematic diagram 40 depicting a viewing angle with respect to an observer 42 of a gloss effect, in accordance with an embodiment. Variations in the angles A and B between the observer 42, a light source 44 and a range 46 of angles A and B contribute to the effectiveness of the gloss effect.

Figure 5:
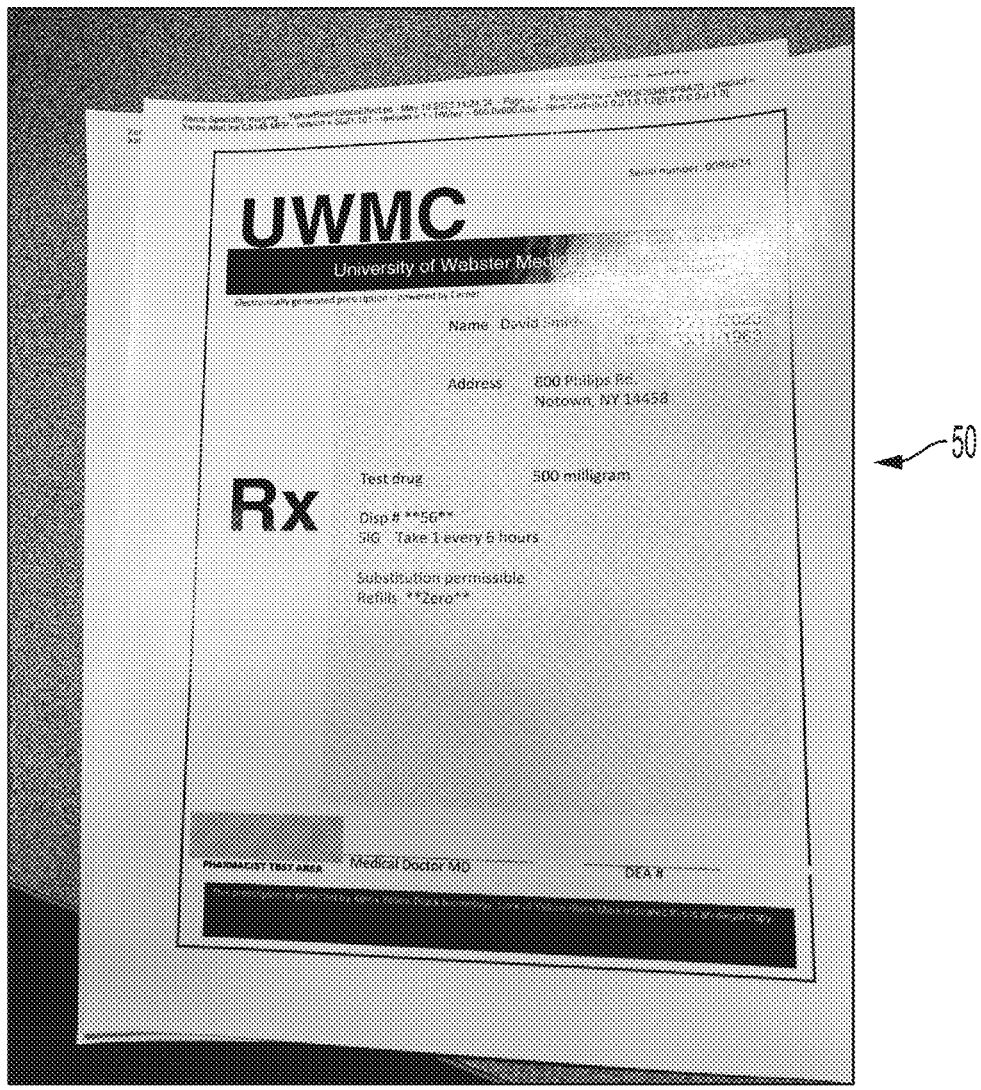
FIG. 5 illustrates an image of a document having a gloss effect that be easily read but which vanishes outside of a range of angles, in accordance with an embodiment.
Figure 6:
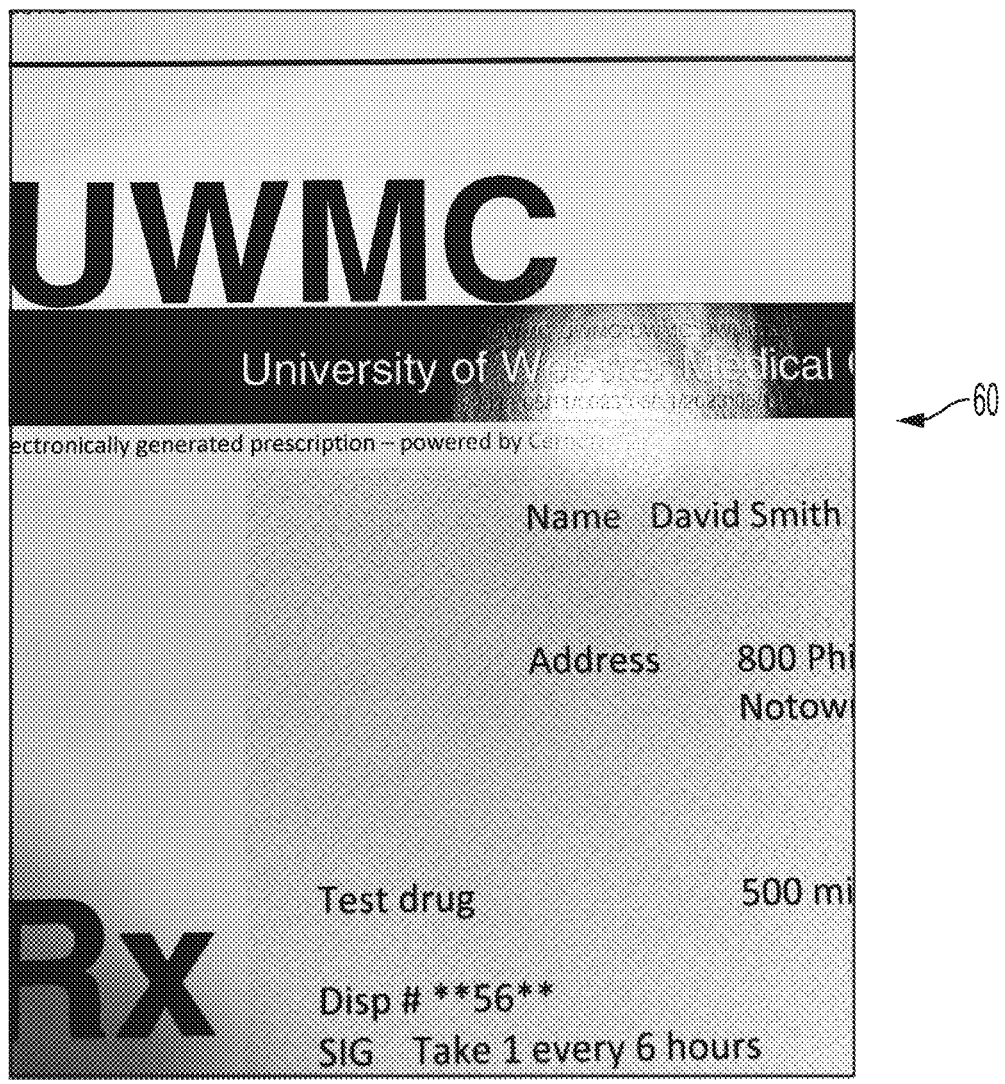
FIG. 6 illustrates an image wherein the hidden part of a watermark becomes visible when zooming in at a larger view than a printed size of a document, in accordance with an embodiment.
Figure 7:
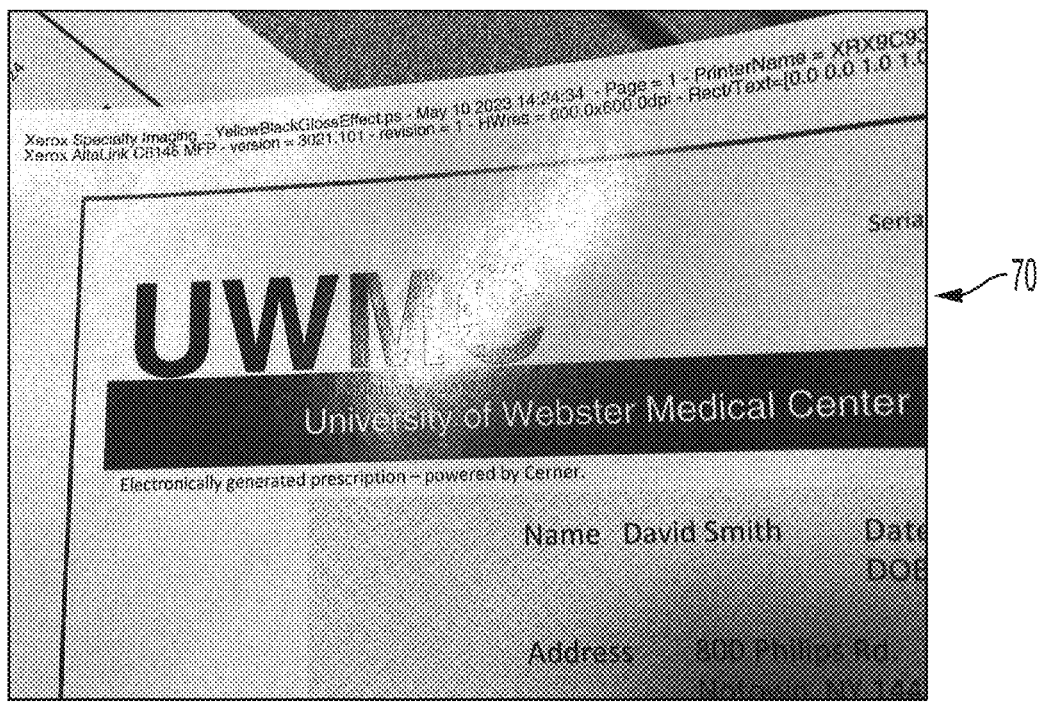
FIG. 7 illustrates an image of a document that shows a yellow, black gloss effect, in accordance with an embodiment.

FIG. 5 illustrates an image 50 of a document having a gloss effect that be easily read but which vanishes outside of a range of angles, in accordance with an embodiment. FIG. 6 illustrates an image 60 wherein the hidden part of a watermark becomes visible when zooming in at a larger view than a printed size of a document, in accordance with an embodiment. FIG. 7 illustrates an image 70 of a document that shows a yellow, black gloss effect, in accordance with an embodiment.

FIG. 5-7 show both the hiding and gloss effect at different sizes. Depending on the angles between the observer, light source, and sample there is a range e.g., between angles A and B discussed above where the gloss effect is easily read and disappears outside that range. Note when zooming in larger than printed size the hidden part of the watermark becomes visible.

Note that as utilized herein, the terms "rich black" and "black" can relate to different variations of the color black, each with its own characteristics. In this context, the color "black" can typically refer to a standard or neutral black color. It is a simple and pure black without any additional color additives. Black is often represented in digital and print design using the key color values: 0% cyan, 0% magenta, 0% yellow, and 100% black (CMYK 0,0,0,100). The term "rich black," on the other hand, is a term that can be used to describe a darker and more intense black color that can be achieved by adding other colorants, typically cyan, magenta, and yellow, in addition to the black ink. This can create a black color that may appears deeper and richer than a simple black. Rich black is often used in printing to enhance the depth and vibrancy of black areas in images or text. Common rich black combinations include 60% cyan, 40% magenta, 40% yellow, and 100% black (CMYK 60,40, 40,100).

Figure 8:
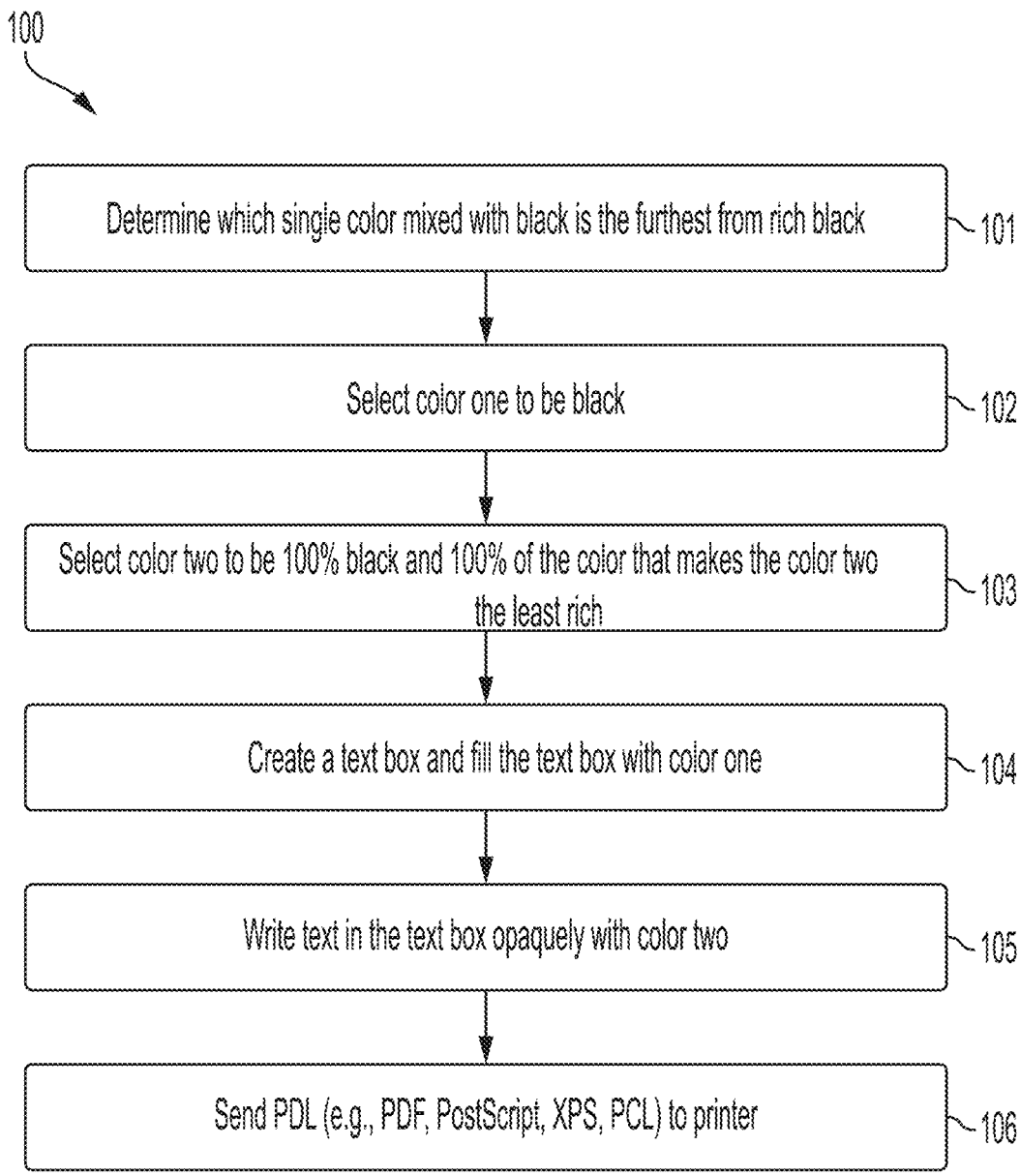
FIG. 8 illustrates a high-level flow chart of operations depicting a method of generating a document with a yellow, black gloss effect, in accordance with an embodiment.

The choice between using standard black or rich black depends on the desired effect and the printing or marking process being used. Rich black is often used when a bolder and more visually striking black is needed, such as for high-quality print materials or when creating watermarks and gloss marks with enhanced visual impact. Standard black, on the other hand, is a simpler and more neutral black that may be used in cases where the richness of color is not a primary concern FIG. 8 illustrates a high-level flow chart of operations depicting a method 200 for generating a document with a yellow, black gloss effect, in accordance with an embodiment. It should be appreciated that references to particular colors such as yellow or other colors is discussed herein for illustrative purposes only. In other words, the embodiments are not limited to the use of a particular color. Reference to certain colors is for exemplary purposes.

As shown at block 101, a step or operation can be implemented to determine which single color mixed with black is furthest from rich black. Then, as depicted next at block 102, a step or operation can be performed to select color one (a first color) to be black. Next, as shown at block 103, a step or operation can be implemented to select color two (a second color) to be 100% black and 100% of the color that makes it the least rich. Thereafter, as illustrated at block 104, a step or operation can be implemented to create a text box and fill it with color one. Note that this operation may be implemented via a tool, such as, for example, Adobe® InDesign, to create the text box and fill it with color one. Next, as depicted at block 105, a step or operation can be implemented to write text in the text box opaquely with color two. This results in an improved gloss effect with hiding capabilities. Thereafter, as indicated at block 106, a step or operation can be implemented to send an electronic file with the text box/text and colors exhibiting the gloss effect to a printer for printing. The electronic file containing the gloss effect may be, for example, a page description language (PDL) document such as, for example, PDF, PostScript, XPS, PCL, etc. The steps or operations shown at blocks 103 and 104 can switch colors and the effect can work about the same.

Note that rich black from a graphic artist viewpoint is blacker than black. For a CMYK printer Y (yellow) is the color that is chosen. Many highlight colors such as white, florescent yellow and pink should also work. Clear is a possibility. This also means a monochrome plus highlight printer can for the first time have a gloss effect.

Figure 9:
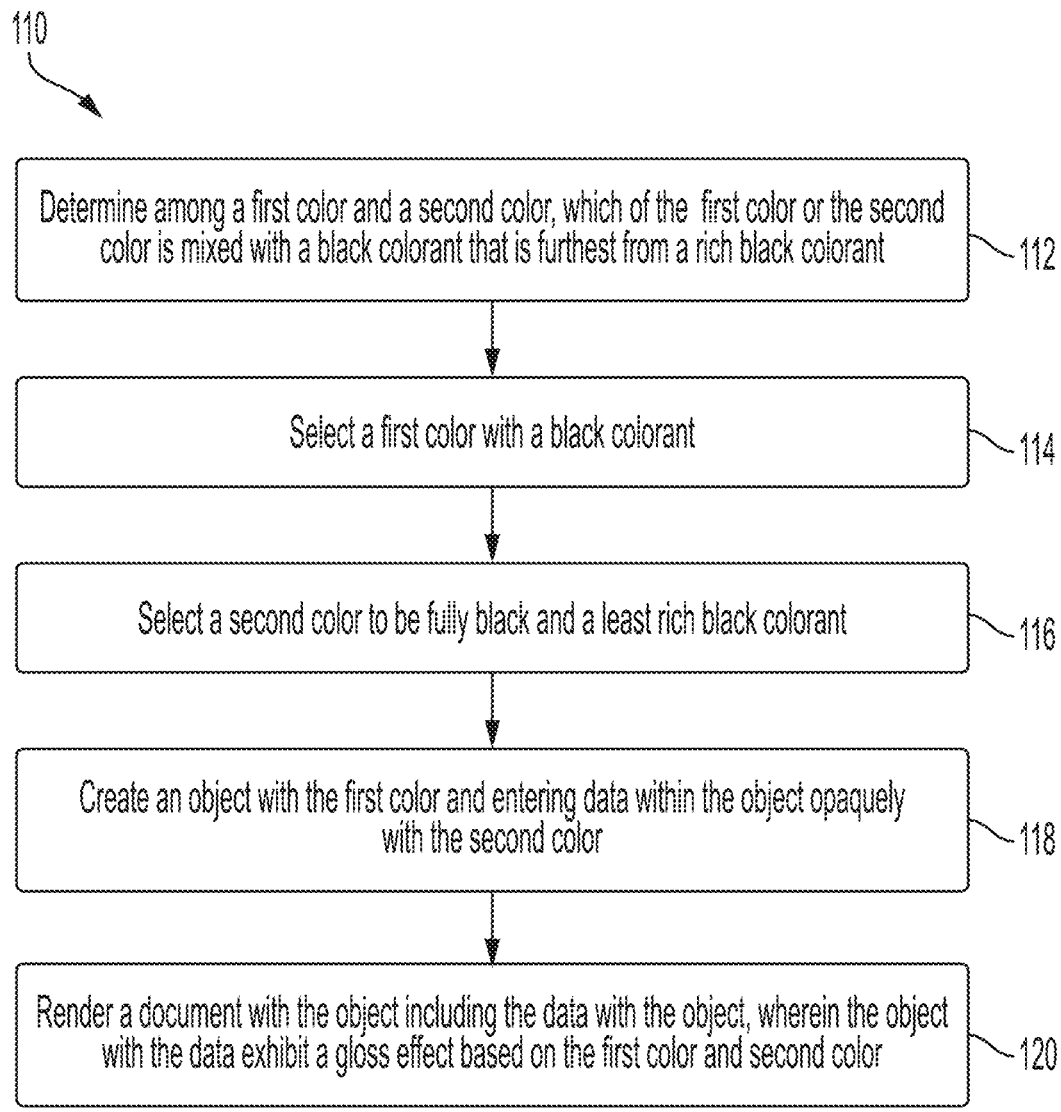
FIG. 9 illustrates a high-level flow chart of operations depicting a method for rendering a gloss effect with improved hiding, in accordance with an embodiment.

FIG. 9 illustrates a high-level flow chart of operations depicting a method 110 for rendering a gloss effect with improved hiding, in accordance with an embodiment. As indicated at block 112, a step or operation can be implemented for determining among a first color and a second color, which of the first color or the second color is mixed with a black colorant that is furthest from a rich black colorant. Then, as indicated at block 114, a step or operation can be implemented for selecting a first color with the black colorant. Next, as depicted at block 116, a step or operation can be implemented for selecting a second color to be fully black and a least rich black colorant.

A step or operation can be then implemented as shown at block 118 for creating an object with the first color and entering data within the object opaquely with the second color. Note that the term 'object' as utilized herein can relate to a graphical or design element including text, images and/or color, which that be rendered on or via a recording medium such as a printed paper or other document. Rendering may be accomplished using a printing system or printer such as discussed herein. This object can include various attributes such as colors, text, shapes, and other visual elements.

As shown at block 120, a step or operation can be implemented to render a document with the object including the data with the object, wherein the object with the data exhibit a gloss effect based on the first color and the second color. Note that the document when rendered with the object including the data may include a watermark with the gloss effect that hides at one angle and appears at another angle on both coated media and uncoated media. The object in some embodiments may be a text box and the data within the object may include text. In some cases, the rendered text may include textual content, graphical elements, or a combination thereof. The step or rendering the document as shown at block 120 may involve formatting the document in an electronic format independent of software, hardware or an operating system in which the document is viewable. The rendering step depicted at block 120 may also involve transmitting the document in an electronic document format to a printer for printing.

Figure 10:
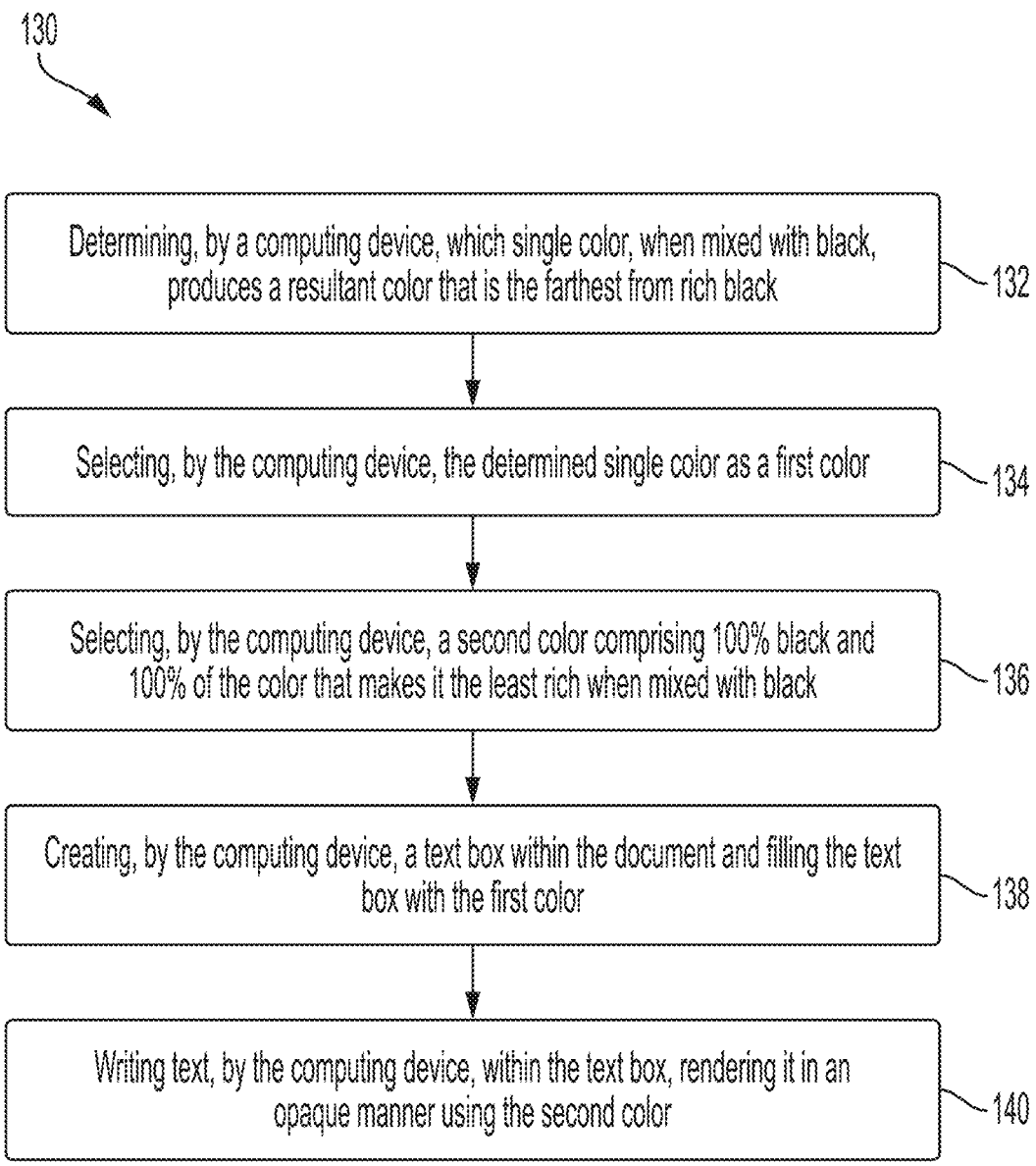
FIG. 10 illustrates a high-level flow chart of operations depicting a method for generating a print-ready document with optimized color contrast, in accordance with an embodiment.

FIG. 10 illustrates a high-level flow chart of operations depicting a method 130 for generating a print-ready document with optimized color contrast, in accordance with an embodiment. As indicated at block 132, a step or operation can be implemented for determining, by a computing device, which single color, when mixed with black, produces a resultant color that is the farthest from rich black. Then, as depicted at block 134, a step or operation can be implemented for selecting, by the computing device, the determined single color as a first color. Then, as illustrated at block 136, a step or operation can be implemented for selecting, by the computing device, a second color comprising 100% black and 100% of the color that makes it the least rich when mixed with black. Next, as indicated at block 138, a step or operation can be implemented for creating, by the computing device, a text box within the document and filling the text box with the first color. Then, as shown at block 140, a step or operation can be implemented for writing text, by the computing device, within the text box, rendering it in an opaque manner using the second color. The document can be then transmitted by the computing device in an electronic document format to a printer for printing.

Figure 11:
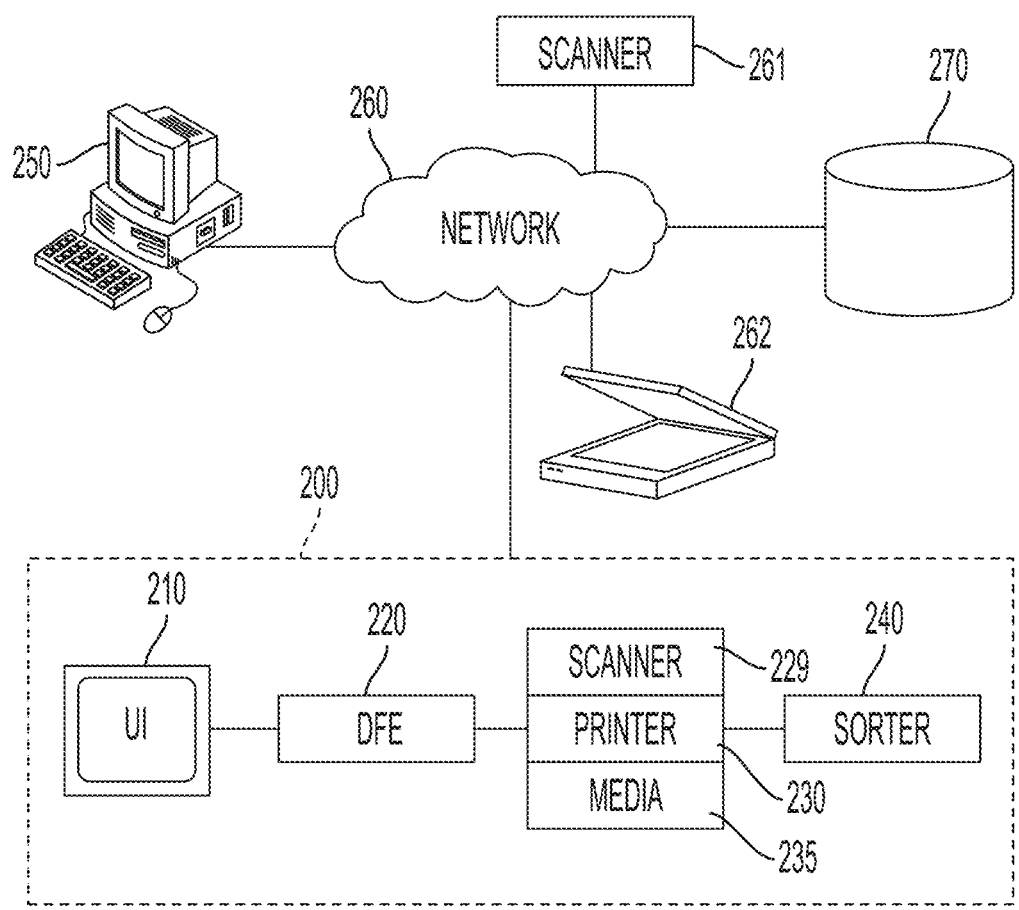
FIG. 11 illustrates a block diagram of a printing system suitable for implementing one or more of the disclosed embodiments.
Figure 12:
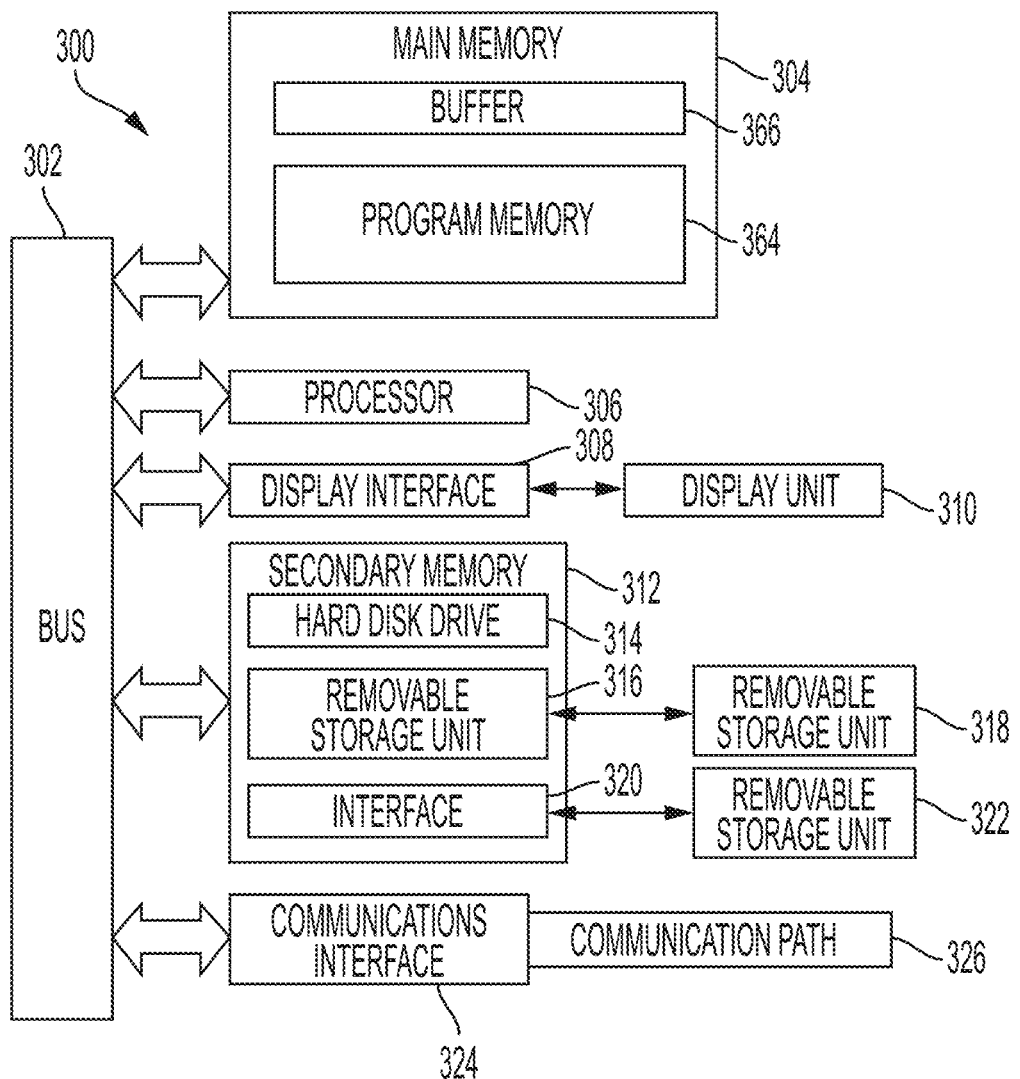
FIG. 12 illustrates a block diagram of a digital front-end controller useful for implementing one or more of the disclosed embodiments.

FIG. 11 illustrates a block diagram of a printing system 200 suitable for implementing one or more of the disclosed embodiments. FIG. 12 illustrates a block diagram of a digital front-end controller 300 useful for implementing one or more of the disclosed embodiments. For example, the printing system 200 and/or the digital front-end controller 300 can be used to render a document with a yellow, black gloss effect.

With reference to FIG. 11, a printing system (or image rendering system) 200 suitable for implementing various aspects of the exemplary embodiments described herein is illustrated. The printing system 200 can implement rendering operations such as scanning a document via a scanner and printing a document via a printer, wherein the document exhibits the disclosed yellow, black gloss effect.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. The scanner may also be incorporated into, for example, a printing system such as the printing system 200 shown in FIG. 11. For example, the scanner 229 is shown in FIG. 9 as a part of the printing system 200. Alternatively, or in addition to the scanner 229 included as a part of the printing system 100, a scanner may be implemented as a separate scanner 262 also depicted in FIG. 11, which can communicate with the network 260.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 200 can include a user interface 210, a digital front-end (DFE) controller 220, and at least one print engine 230. The print engine 230 has access to print media 235 of various sizes and cost for a print job. The printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. One or more color sensors (not shown) may be embedded in the printer paper path, as known in the art.

With respect to FIG. 12, an exemplary DFE (Digital Front End) controller 300 is shown in greater detail. The DFE controller 300 can include one or more processors, such as processor 306, which is capable of executing machine executable program instructions. The processor 306 can function as a DFE processor.

In the embodiment shown in FIG. 12, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., that stores computer software and/or data.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 shown in FIG. 12 can include a communications interface 324, which can act as an input and an output to allow software and data to be transferred between the digital front end controller 300 and external devices. Examples of a communications interface include a modem, a network interface (such as an Ethernet card), a communications port, a PCMCIA slot and card, an ExpressCard slot, SCSI port, et.

Computer programs (also called computer control logic) and including one or more modules may be stored in the main memory 304 and/or the secondary memory 312. Computer programs or modules may also be received via a communications interface 324. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods.

These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 11 and/or the DFE controller 300 shown in FIG. 12. A "module" can perform the various steps, operations or instructions discussed herein, such as one or more of the steps or operations discussed herein.

The methods described herein, for example, may be implemented, in part, in a computer program product comprising a module that may be executed by, for example, DFE controller 220. The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 8).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which the security device (e.g., a watermark) may be rendered.

Based on the foregoing, it can be appreciated that a number of different embodiments including preferred and alternative embodiments, are disclosed herein. For example, in an embodiment, a method for rendering a gloss effect, can involve steps or operations including determining among a first color and a second color, which of the first color or the second color is mixed with a black colorant that is furthest from a rich black colorant; selecting a first color with the black colorant; selecting a second color to be fully black and a least rich black colorant; creating an object with the first color and entering data within the object opaquely with the second color; and rendering a document with the object including the data with the object, wherein the object with the data exhibit a gloss effect based on the first color and the second color.

In an embodiment, the document when rendered with the object can include the data comprises a watermark with the gloss effect that hides at one angle and appears at another angle on both coated media and uncoated media.

In an embodiment, the object can comprise a text box and the data within the object comprises text.

In an embodiment, the text rendered may include textual content, graphical elements, or a combination thereof.

In an embodiment, rendering of the document can further involve formatting the document in an electronic format independent of software, hardware or an operating system in which the document is viewable.

In an embodiment, rendering of the document can further involve transmitting the document in an electronic document format to a printer for printing.

In an embodiment, the electronic document format may comprise a page description language (PDL) document.

In an embodiment, rendering the document can further involve printing the document via a printing system.

In an embodiment, a method for generating a print-ready document with optimized color contrast, can involve: determining, by a computing device, which single color, when mixed with black, produces a resultant color that is the farthest from rich black; selecting, by the computing device, the determined single color as a first color; selecting, by the computing device, a second color comprising 100% black and 100% of the color that makes it the least rich when mixed with black; creating, by the computing device, a text box within the document and filling the text box with the first color; writing text, by the computing device, within the text box, rendering it in an opaque manner using the second color.

An embodiment may can further involve transmitting by the computing device, the document in an electronic document format to a printer for printing.

In an embodiment, system for rendering a gloss effect image on a recording medium, can include a processor and a computer-readable medium containing programming instructions that can be configured to cause the processor to: determine among a first color and a second color, which of the first color or the second color is mixed with a black colorant that is furthest from a rich black colorant; select a first color with the black colorant; select a second color to be fully black and a least rich black colorant; create an object with the first color and entering data within the object opaquely with the second color; and render the object including the data with the object on a recording medium, wherein the object with the data exhibits a gloss effect based on the first color and the second color.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a gloss effect, comprising:
    determining among two colors, which one of the two colors is mixed with a black colorant that is furthest from a rich black colorant;
    selecting a first color with the black colorant;
    selecting a second color to be fully black and a least rich black colorant;
    creating an object with the first color and entering data within the object opaquely with the second color; and
    rendering a document with the object including the data with the object, wherein the object with the data exhibit a gloss effect based on the first color and the second color.

2. The method of claim 1 wherein the document when rendered with the object including the data comprises a watermark with the gloss effect that hides at one angle and appears at another angle on both coated media and uncoated media.

3. The method of claim 1 wherein the object comprises a text box and the data within the object comprises text.

4. The method of claim 3 wherein the text rendered includes textual content, graphical elements, or a combination thereof.

5. The method of claim 1 wherein rendering the document further comprises:
    formatting the document in an electronic format independent of software, hardware or an operating system in which the document is viewable.

6. The method of claim 1 wherein rendering the document further comprises:
    transmitting the document in an electronic document format to a printer for printing.

7. The method of claim 6 wherein the electronic document format comprises a page description language (PDL) document.

8. The method of claim 1 wherein rendering the document further comprises:
    printing the document via a printing system.

9. A method for generating a print-ready document with optimized color contrast, comprising:
    determining, by a computing device, which single color, when mixed with black, produces a resultant color that is the farthest from rich black;
    selecting, by the computing device, the determined single color as a first color;
    selecting, by the computing device, a second color comprising 100% black and 100% of the color that makes the second color the least rich when mixed with black;
    creating, by the computing device, a text box within the document and filling the text box with the first color;
    writing text, by the computing device, within the text box, rendering it in an opaque manner using the second color.

10. The method of claim 9 further comprising transmitting by the computing device, the document in an electronic document format to a printer for printing.

11. The method of claim 10 wherein the electronic document format comprises a page description language (PDL) document.

12. The method of claim 9 wherein the text rendered includes textual content, graphical elements, or a combination thereof.

13. A system for rendering a gloss effect image on a recording medium, comprising:
    a processor; and
    a computer-readable medium containing programming instructions that are configured to cause the processor to:
        determine among two colors, which of the two colors is mixed with a black colorant that is furthest from a rich black colorant;
        select a first color with the black colorant;
        select a second color to be fully black and a least rich black colorant;
        create an object with the first color and entering data within the object opaquely with the second color; and
        render the object including the data with the object on a recording medium, wherein the object with the data exhibits a gloss effect based on the first color and the second color.

14. The system of claim 13 wherein the document when rendered comprises a watermark with the gloss effect that hides at one angle and appears at another angle on both coated media and uncoated media.

15. The system of claim 13 wherein the object comprises a text box and the data within the object comprises text.

16. The system of claim 15 wherein the text rendered includes textual content, graphical elements, or a combination thereof.

17. The system of claim 13 wherein rendering the document further comprises:
    formatting the document in an electronic format independent of software, hardware or an operating system in which the document is viewable.

18. The system of claim 13 wherein rendering the document further comprises:
    transmitting by the computing device, the document in an electronic document format to a printer for printing.

19. The system of claim 18 wherein the electronic document format comprises a page description language (PDL) document.

20. The system of claim 13 wherein rendering the document further comprises:
    printing the document via a printing system.

* * * * *